United States Patent [19]

Lissy

[11] 4,057,158
[45] Nov. 8, 1977

[54] AIRCRAFT TOWING VEHICLE

[76] Inventor: Igor Lissy, 115 S. Ivy Lane, Glen Mills, Pa. 19342

[21] Appl. No.: 691,741

[22] Filed: June 1, 1976

[51] Int. Cl.² .......................................... B60B 29/00
[52] U.S. Cl. ................................. 214/330; 180/14 C; 244/50; 280/442
[58] Field of Search .............................. 214/330–334; 244/50; 180/14 C, 79.1; 280/442

[56] References Cited

U.S. PATENT DOCUMENTS

| 1,876,684 | 9/1932 | Jonkhoff | 280/442 |
| 2,846,018 | 8/1958 | Puckett | 180/14 C |
| 3,038,550 | 6/1962 | Lehmann et al. | 180/14 C |
| 3,572,458 | 3/1971 | Tax | 180/79.1 |

Primary Examiner—Lawrence J. Oresky
Attorney, Agent, or Firm—R. S. Sciascia; Henry Hansen

[57] ABSTRACT

An aircraft towing vehicle employing steering geometry which provides a common turning center. Laterally rigid hitch arms are attached to the vehicle for grasping the aircraft nose or tail wheel. Coordinated all-wheel vehicle steering causes the center of turn always to fall somewhere on the nose or tail wheel axis to avoid sideslip during turns.

22 Claims, 11 Drawing Figures.

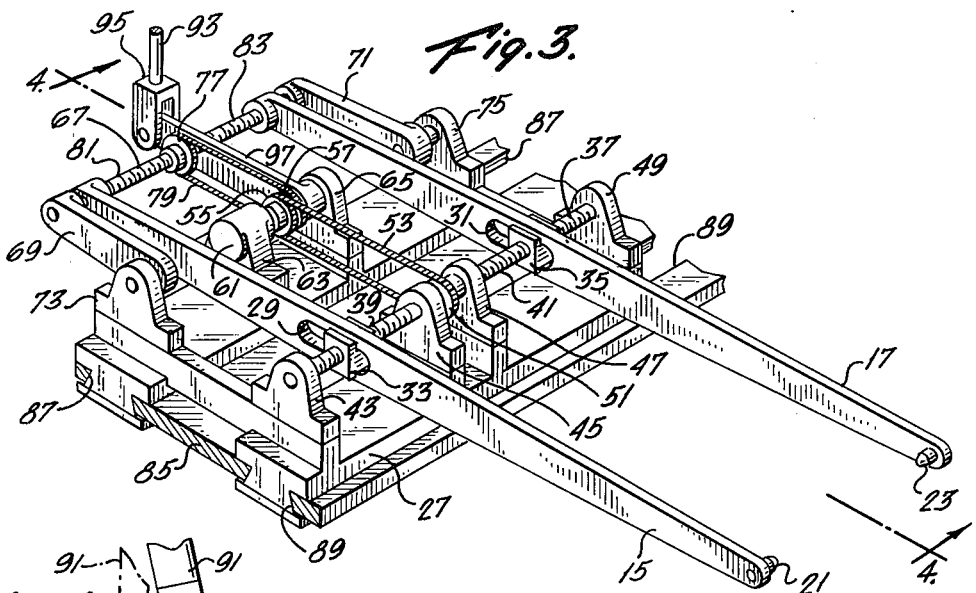

AIRCRAFT TOWING VEHICLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to an aircraft towing vehicle and more particularly to an aircraft towing vehicle employing rigid hitch arms and coordinated all-wheel steering.

In the field of aircraft towing, spotting and handling on the ground, it has been the general practice to employ a tractor in combination with a tow bar to move aircraft. Although such devices have served the purpose, they have not proved entirely satisfactory under all conditions of service because of the substantial length and complexity of the three-component train composed of the tractor, tow bar and aircraft, including two articulating joints, the aircraft-wheel and the tractor pintle hook. This arrangement is often too long and unwieldy, requiring considerable maneuvering area and a highly skilled driver, especially when pushing the aircraft. The length of this train makes it undesirable for use aboard aircraft carriers and in restricted spaces. Furthermore, tow bars suffer from a high damage rate and are a major expense.

Another exemplary prior art device, called the "spotting dolly," has also been used to move and spot aircraft. The spotting dolly has a large cut-out in one end to accommodate hydraulically powered lift arms which engage and lift the aircraft nose or tail wheel, which the spotting dolly wheels straddle. However, the spotting dolly has not proven entirely satisfactory under all conditions of service because the spotting dolly body must straddle the aircraft nose or tail wheel, so that the vehicle is restricted in height in order to accommodate most aircraft. This height restriction limits the size, power and drawbar pull of the spotting dolly, since available low profile engines are of limited power. In addition, the spotting dolly cannot attach to deeply recessed wheels under low fuselage aircraft. Furthermore, there is a possibility of aircraft wheel droppage, and an imposed download which is often much greater than the total vehicle weight.

SUMMARY OF THE INVENTION

Accordingly, it is the general purpose of the present invention to provide a multi-purpose aircraft towing vehicle with improved maneuverability and able to handle aircraft of any gross weight or configuration, on flight deck, hangar deck or shore base.

Other objects of the present invention are to provide an aircraft towing vehicle capable of engaging difficult to reach aircraft wheels and having adequate stand-off from the aircraft while still enforcing the proper sterring geometry so that the towing vehicle height, and thus enging size, limitations can be relaxed. Further objects of the present invention are to provide an easily maneuverable aircraft towing vehicle usable in restricted spaces such as on an aircraft carrier, which does not require a highly skilled operator, thus easing operator training, and whose steering geometry prevents side scraping on the aircraft wheel and side loads on the attaching arms engaging the wheel even though the attachment to the towing vehicle is rigid. Still further objects of the present invention are to provide a simpler, shorter, more wieldy train for connection between an aircraft towing vehicle and an aircraft, to eliminate the need for tow bars in aircraft towing vehicles, and to avoid sideslip during turns.

Briefly, these and other objects are accomplished by a self-propelled aircraft towing vehicle having laterally rigid hitch arms for engaging the aircraft nose (or tail) wheel, and all of whose wheels are steered in a manner which keeps their common center of turn on the aircraft nose (or tail) wheel axis or centerline, permitting a pivot turn around that aircraft wheel and preventing sideslip during turns. The rigid hitch arms provide a stand-off from the aircraft, and the rigid attachment to the aircraft wheel results in a more wieldy two-component train, the vehicle with the rigidly attached nose wheel being one component and the aircraft with its main wheels being the other component, with a single articulating joint or pivot, the aircraft nose or tail wheel mechanism. The coordinated all-wheel steering is accomplished by means of steering cams shaped for any desired hitch arms length, each of which control a hydraulic steering valve which with a corresponding rotary actuator steers a single wheel or set of wheels. The hitch arms can be brought together or separated for engagement or disengagement of an aircraft wheel, and can be raised or lowered to engage various aircraft wheels. However, in order to enforce the proper steering geometry, when the ends of the hitch arms equipped to engage the aircraft wheel are raised or lowered, a crankshaft mechanism together with a pair of sliding joints causes those ends to move in a vertical plane.

Other objects, advantages and novel features of the invention will become apparent from the following detailed description of the invention when considered in conjunction with the accompanying drawings wherein:

BRIEF DESCRIPTION OF THE DRAWINGS

FIG. 3 is a more detailed isometric view of the hitch arms mechanism of the vehicle of FIG. 2;

FIG. 4 is a section of the hitch arms mechanism taken on the line 4—4 of FIG. 3;

FIG. 5 is a diagrammatic view of the vehicle of FIG. 2, illustrating the required steering geometry for the wheels;

DESCRIPTION OF THE PREFERRED EMBODIMENT

Figure 1:
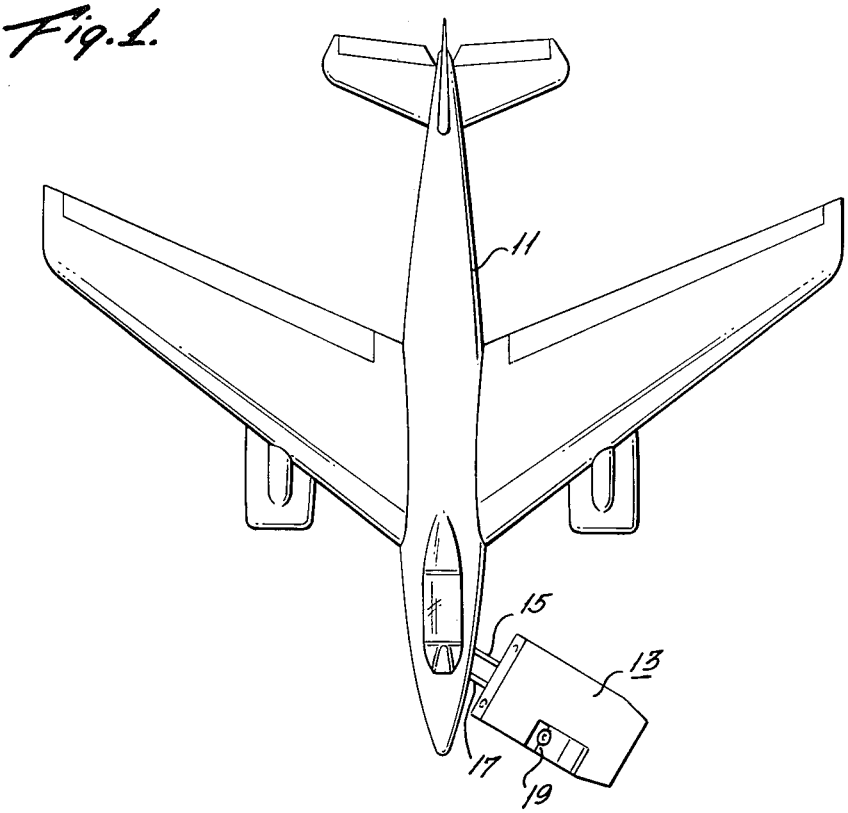
FIG. 1 shows in plan view aircraft handling by means of an aircraft towing vehicle according to the invention engaging the nose wheel of an aircraft.
Figure 2:
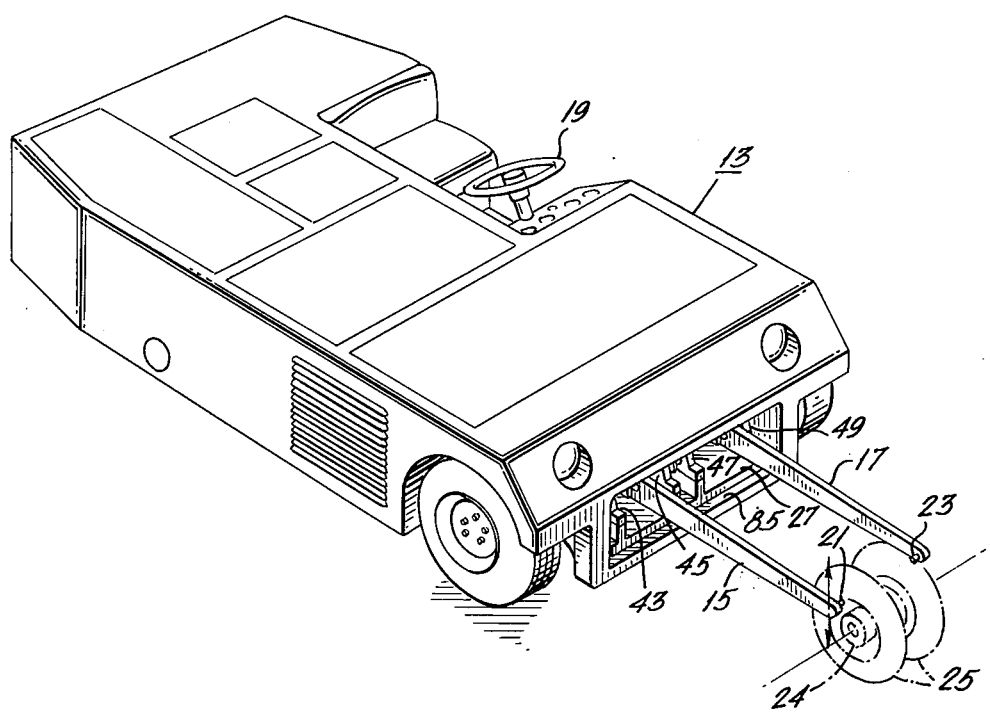
FIG. 2 is an overall isometric view of the aircraft towing vehicle of FIG. 1 with the rigid hitch arms thereof adjacent to the nose wheels of the aircraft.

Referring now to the drawings, wherein like reference characters designate like or corresponding parts throughout the several views, there is shown in FIG. 1 an arrangement of a typical aircraft 11 being moved on the ground by the aircraft towing vehicle 13 of the present invention by means of laterally parallel rigid hitch arms 15 and 17 of the vehicle, the vehicle being located at the nose of the aircraft. It should be understood that the aircraft towing vehicle 13 can also operate at the tail of the aircraft 11. The aircraft towing vehicle 13 is shown in greater detail in FIG. 2. Vehicle 13 is steered using steering wheel 19 as is set out more fully below, although a lever could be used in lieu of the steering wheel. Vehicle 13 is provided with laterally parallel rigid hitch arms 15 and 17, whose external tips are equipped with pins 21 and 23 which seat in the hollow axle 24 of the aircraft nose wheels 25 (shown here in phantom view), although the aircraft tail wheel could be similarly engaged instead. Hitch arms 15 and 17 are mounted on hitch arms mechanism sliding base 27, as is more fully shown in FIG. 3. It should be noted that the nose wheel 25 need not be centered between the hitch arms 15 and 17 nor with respect to the vehicle 13 for the required steering geometry to be obtained.

When the aircraft towing vehicle has been positioned, using the steering geometry set out below, to engage an aircraft wheel 25, initially hitch arms 15 and 17 are positioned some distance apart so that the aircraft wheel can be received between engagement pins 21 and 23. When vehicle 13 is positioned so that the aircraft wheel 25 is positioned appropriately between engagement pins 21 and 23, hitch arms 15 and 17 must then be moved together so that pins 21 and 23 can engage the hollow axle 24. This is accomplished as shown in FIG. 3. Hitch arm 15 is supported at hitch arm opening 29 by slide block 33 which is slidably mounted in opening 29. Similarly, hitch arm 17 is supported at hitch arm opening 31 by slide block 35 which is slidably mounted in opening 31. Slide blocks 33 and 35 in turn threadingly engage threaded bar 37. Threaded bar 37 has a sprocket 51 attached at its center. Bar 37 is supported at its ends by fixed bearings 43 and 49 and at either side of sprocket 51 by fixed bearings 45 and 47, all of which are mounted on mechanism base 27. For threaded bar 37, the thread 39 which engages slide block 33 is a right-hand thread. The thread 41 of threaded bar 37 which engages slide block 35 is a left-hand thread. Sprocket 51 engages, and is driven by, roller chain 53, which in turn engages, and is driven by, sprocket 55. Sprockets 55 and 57 are turned by hydraulic motor 61, which is supported by mount 63 on base 27. Hitch arm 15 is further supported at its end opposite engagement pin 21 by threaded bar 67 which it threadingly engages. Similarly, hitch arm 17 is further supported at its end opposite engagement pin 23 by threaded bar 67 which it threadingly engages. Threaded bar 67 is supported at either end by crankshafts 69 and 71, which in turn are supported by fixed bearings 73 and 75, respectively. Fixed bearings 73 and 75 are part of base 27. Threaded bar 67 is also supported by arm 97 which is attached to elevating piston 93 via pivot joint 95, as further discussed below. Sprocket 77 is fixedly mounted at the center of threaded bar 67, and engages and is driven by roller chain 79. Roller chain 79 in turn engages and is driven by sprocked 57 which, with sprocket 55, is driven by hydraulic motor 61. For threaded bar 67, like threaded bar 37, the thread 81 which engages hitch arm 15 is a right-hand thread, and the thread 83 which engages hitch arm 17 is a left-hand thread. Hydraulic motor 61 can be operated to bring together or separate hitch arms 15 and 17, as desired. When hydraulic motor 61 is operated, threaded bars 37 and 67 are turned by means of sprockets 55 and 57, roller chains 53 and 79, and sprockets 51 and 77. Since threaded bars 37 and 67 threadingly engage slide blocks 33 and 35 and hitch arms 15 and 17, turning of bars 37 and 67 results in the separation or bringing together of hitch arms 15 and 17. In this manner, hitch arms 15 and 17 are separated or brought together, as desired, by operation of hydraulic motor 61, to effect engagement and disengagement of the hollow axle of an aircraft wheel by pins 21 and 23. Vehicle 13 need not be so positioned in advance so that the aircraft wheel to be engaged is centered between pins 21 and 23, because base 27 is slidably mounted on base 85 at dovetail slots 87 and 89. Thus, as hydraulic motor 61 would move hitch arms 15 and 17 together for engagement of an aircraft wheel which has not been centered, as one of the hitch arms would be brought against one side of the aircraft wheel by motor 61, continued operation of motor 61 would continue to bring the two hitch arms closer together, and the aircraft wheel would stop the movement off the hitch arm contacting it, thus causing base 27 to slide on base 85.

In order to be able to engage various aircraft wheels of various heights, engagement pins 21 and 23 must be raised or lowered. However, engagement pins 21 and 23 must be vertically adjustable with a minimum of disturbance in the projected length of hitch arms 15 and 17 to which these pins are respectively attached, otherwise the steering geometry of vehicle 13 would be distrubed beyond acceptable limits. In other words, in order to maintain proper steering geometry, it is necessary that engagement pins 21 and 23 each travel in a vertical plane when hitch arms 15 and 17 are raised or lowered. This is accomplished, as shown in FIG. 4, by utilizing crankshafts 69 and 71 to automatically compensate for projected length variations of arms 15 and 17 caused by the arms pivoting about a horizontal axis for tip height adjustment. Elevating cylinder 91 can extend or retract piston 93 to lower or raise pivot joint 95 which is attached to arm 97. In turn, arm 97, which is supported by and pivots about fixed bearing 65, on base 27, lowers or raises threaded bar 67 according to the extended length of piston 93. As threaded bar 67 is raised or lowered by elevating cylinder 91, crankshafts 69 and 71 and the ends of hitch arms 15 and 17 opposite ends 21 and 23 are also raised and lowered along with the bar. The crankshaft mechanism of arm 97 and crankshafts 69 and 71, in cooperating with the sliding joints formed by slide blocks 33 and 35 in hitch arms openings 29 and 31, respectively, cause threaded bar 67 to move in the circular path shown in FIG. 4 as it is moved up and down by elevating cylinder 91, resulting in the desired vertical-line path shown in FIG. 4 for pin 23.

FIG. 5 illustrates the steering geometry requirements for the aircraft towing vehicle 13 of the invention. A novel feature of the aircraft towing vehicle 13 is the achievement of the proper steering geometry with the vehicle and the aircraft wheel 25 attached by means of laterally rigid hitch arms 15 and 17. Such rigid attachment results in a two component train (the vehicle 13 with the rigidly attached nose or tail wheel 25 being one component and the aircraft with its main wheels being the other component) with single articulation (the aircraft nose or tail wheel mechanism). To achieve a freely-rolling condition in this vehicle/aircraft configuration, all wheels of the first train component are required to have their axes intersect at a common point which is forced always fall somewhere along the aircraft nose (or tail) wheel 25 axis which is fixed in a remote position from the vehicle frame by means of the hitch arms 15 and 17. All wheels 99, 101, 103 and 105 of the vehicle 13 are then steered to meet the common intersection point requirement, as is shown in FIG. 5. Thus, in a typical turn, left front wheel 99 will turn about the common intersecting point P with radius $r_1$ and angle $\theta_1$ from the aircraft nose or tail wheel axis. Similarly, right front wheel 101 turns about point P with radius $r_2$ and at angle $\theta_2$, and dual rear wheels 103 and 105 turn about point P with radius $r_3$ and at angle $\theta_3$. In FIG. 5, vehicle 13 is shown with engagement pins 21 and 23 of hitch arms 15 and 17, respectively, engaging aircraft nose or tail wheel 25. Since this steering geometry requires that each steered wheel or set of steered wheels be set at a different angle with respect to the aircraft wheel which has been engaged by pins 21 and 23, each vehicle wheel or set of wheels must be steered individually. The other train component is free to pivot about the nose or tail wheel axis, thereby insuring a freely-rolling condition for its main wheels. It is contemplated that two separate rear wheels may be used in lieu of dual wheels 103 and 105 without departing from the invention. In such cases, there will be separate radii $r_3$ and $r_4$ and angles $\theta_3$ and $\theta_4$ for the respective wheels because their turning axes are different. Also, a single rear wheel may be used in lieu of dual wheels 103 and 105 without departing from the invention, in which case the rear wheel turn with radius $r_3$ and angle $\theta_3$, such as was the case for dual rear wheels 103 and 105.

Figure 6:
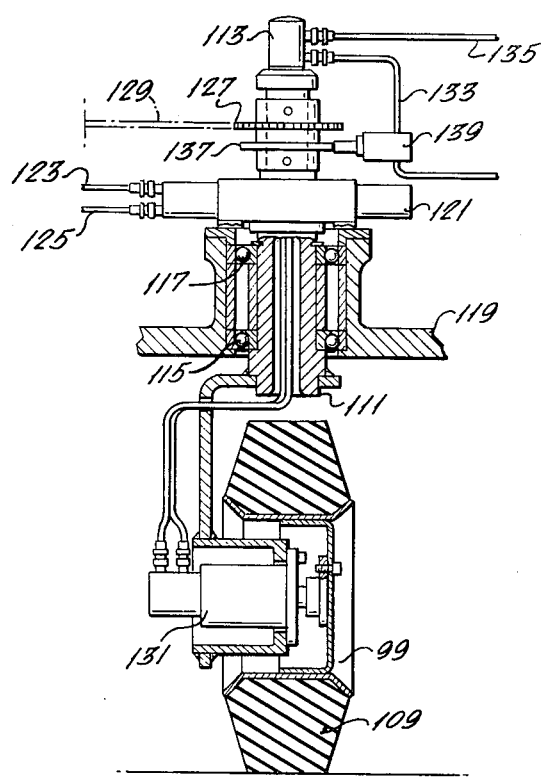
FIG. 6 is an elevation view of a single wheel in the vehicle of FIG. 2.

The apparatus for individual control of the left front wheel 99 is shown in FIG. 6. Tire 109, which can be solid rubber, is mounted on wheel 99. Wheel 99 pivots on steered wheel column 111 which turns on swivel joint 113 and on bearings 115 and 117 attached to vehicle frame 119. Column 111, and thus wheel 99, is turned and thus steered by means of rotary actuator 121 which is controlled by steering hydraulic lines 123 and 125. Rotary actuator 121, like the other rotary actuators taught herein for wheel steering, has limited movement for turning wheel 99 up to 90° to the left or right. Individual control of lines 123 and 125 results in individual control of rotary actuator 121 and thus of the steering of wheel 99. Rotary actuator 121 is controlled via hydraulic lines 123 and 125, as is set out more fully below. As wheel 99 is turned by rotary actuator 121, sprocket 127 fixed to column 111 is also turned, thus resulting in movement by sprocket 127 of mechanical feedback chain 129, which in turn informs the central steering mechanism of the vehicle 13 how far wheel 99 has been turned, as is set out more fully below.

To achieve the maximum possible drawbar pull by the vehicle 13 and to modulate individual wheel speed during turns, wheel 99 is powered by its own wheel hydraulic motor 131 controlled by propulsion hydraulic lines 133 and 135 which pass through swivel joint 113 and steered wheel column 111. Wheel motor 131 control is accomplished by means of wheel speed control cam 137 mounted on and turning with steered wheel column 111 which controls wheel speed control valve or variable orifice 139. Wheel speed control valve 139 is a variable orifice in the propulsion hydraulic line 133 of the wheel motor propulsion circuit, which variable orifice is controlled by cam 137 to control hydraulic flow in propulsion hydraulic line 133 so that the proper hydraulic flow is received by hydraulic motor 131, and thus the proper speed imparted to wheel 99. Right front wheel 101 is individually steered, propelled and controlled by a similar apparatus in the same manner as that shown above for left front wheel 99. Where two separate rear wheels are used in lieu of dual rear wheels 103 and 105, as discussed above, each rear wheel will be individual steered, propelled and controlled by a similar apparatus in the same manner as that shown above for left front wheel 99. Where a single rear wheel is used in lieu of dual rear wheels 103 and 105, as discussed above, the rear wheel will be individually steered, propelled and controlled by a similar apparatus in the same manner as that shown above for left front wheel 99.

Figure 7:
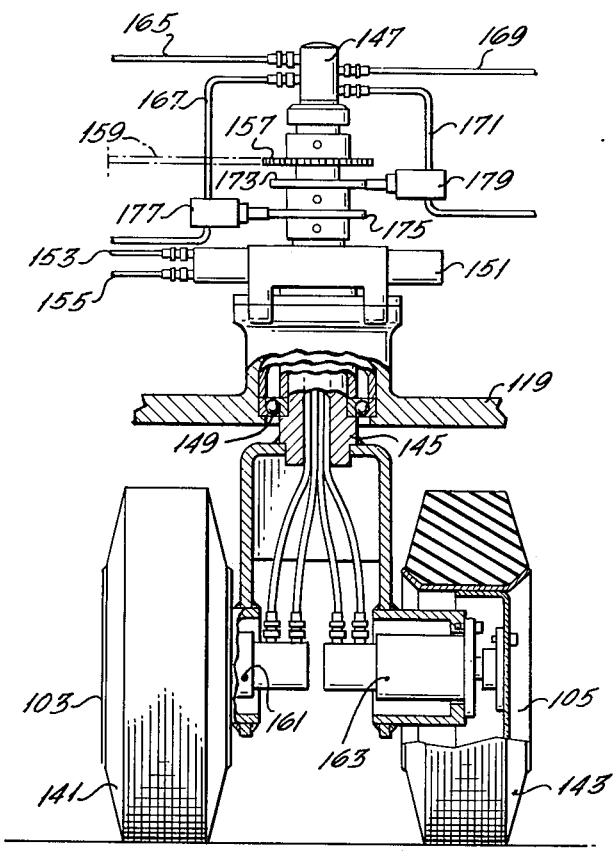
FIG. 7 is an elevation view of the dual wheels in the vehicle of FIG. 2.

For the dual wheel installation shown in FIG. 7, used for the rear wheels 103 and 105 of vehicle 13 shown in FIG. 5, tires 141 and 143, which can be solid rubber, are each mounted on wheels 103 and 105, respectively. Wheels 103 and 105 together pivot on steered wheel column 145 which turns on swivel joint 147 and on bearings 149 attached to vehicle frame 119. Column 145, and thus wheels 103 and 105, is turned and thus steered by means of rotary actuator 151 which is controlled by steering hydraulic lines 153 and 155. Individual control of lines 153 and 155 results in individual control of rotary actuator 151 and thus of the steering of wheels 103 and 105 together. As wheels 103 and 105 are turned by rotary actuator 151, sprocket 157 fixed to column 145 is also turned, thus resulting in movement by sprocket 157 of mechanical feedback chain 159 which in turn informs the central steering mechanism of the vehicle 13 how far wheels 103 and 105 have been turned, as is more fully set out below. As is the case with left front wheel 99, each wheel 103 and 105 is powered by its own wheel hydraulic motor 161 and 163 respectively, controlled by propulsion hydraulic lines 165, 167, 169 and 171, which pass through swivel joint or rotating coupling 147 and steered wheel column 145. Control of wheel motors 161 and 163 is accomplished by means of wheel speed control cams 173 and 175 mounted on and turning with steered wheel column 145, each of which controls a wheel speed control valve, or variable orifice, 177 or 179. Each wheel speed control valve 177 and 179 is a variable orifice in a propulsion hydraulic line 167 or 171 of the wheel motor propulsion circuit for either of the two wheels 103 or 105, which variable orifice is controlled by a cam 173 or 175, respectively, to control hydraulic flow in propulsion hydraulic lines 167 and 171, respectively, so that the proper hydraulic flow is received by hydraulic motors 161 and 163, and thus the proper motor speed is imparted to each wheel 103 and 105 during a turn.

Figure 8:
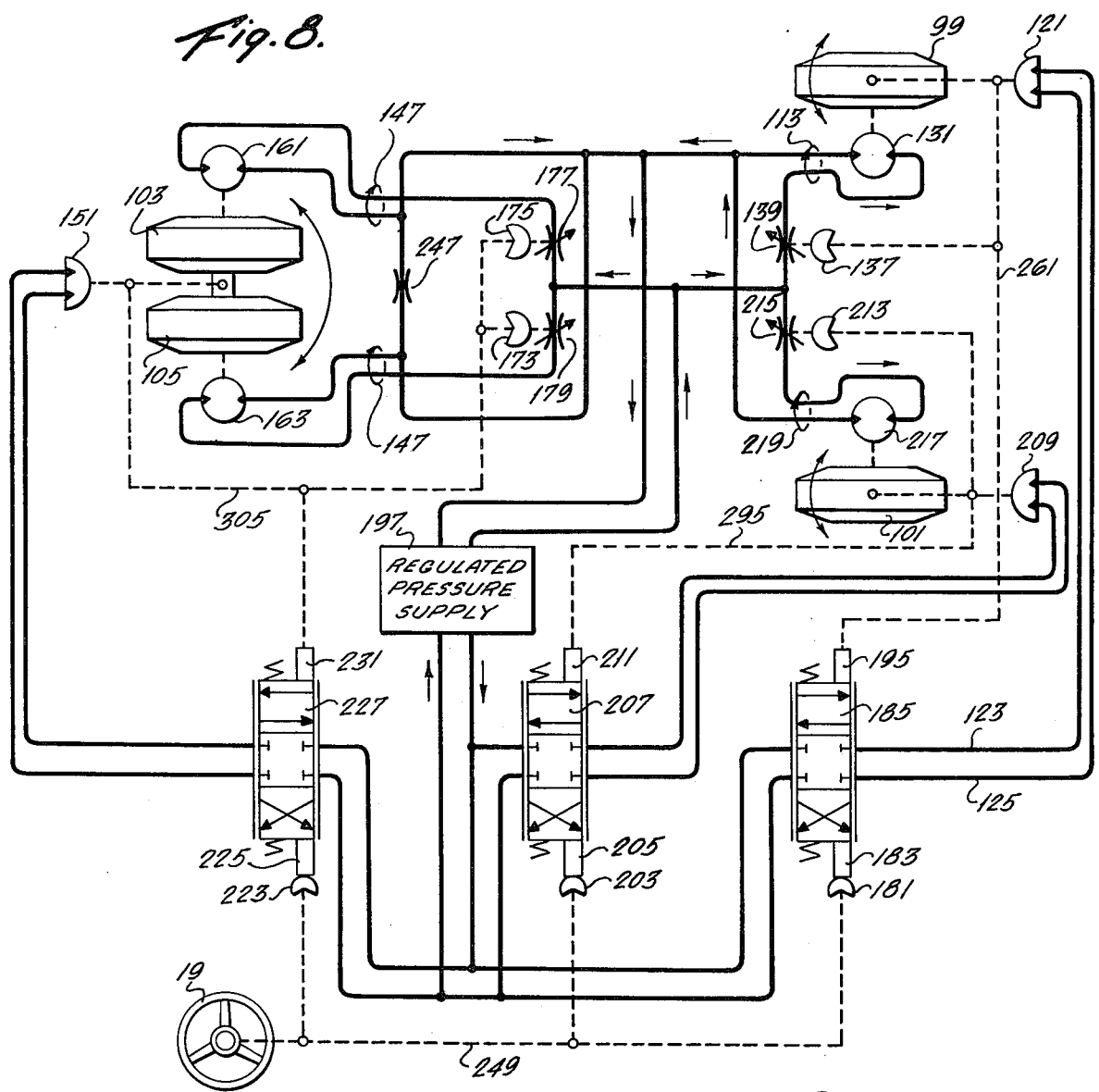
FIG. 8 is a schematic diagram of the hydraulic system of the vehicle of FIG. 2.

The schematic diagram for the overall hydraulic system of the aircraft towing vehicle is shown in FIG. 8. The graphic symbols used in FIG. 8 are taken from publication number USAS Y32.10-1967, *USA Standard Graphic Symbols for Fluid Power Diagrams*, published by the American Society of Mechanical Engineers, New York, reprinted 1972. For left front wheel 99, turning of steering wheel 19 turns steering cam 181 against cam follower 183 which controls steering valve 185. Steering valve 185 is a standard 3-position four-way directional valve with a closed center. Valve 185 controls rotary actuator 121 which turns left front wheel 99 on a pivot, as shown. Turning of wheel 99 in turn results in turning of wheel speed control cam 137 which controls variable orifice 139 placed on the hydraulic line to wheel motor 131 which propels wheel 99. Turning of wheel 99 also actuates mechanical steering feedback 195 which shuts off steering valve 185, as is more fully set out below. Regulated pressure supply 197 supplies a flow of hydraulic fluid to the system with constant pressure and includes a reservoir and return. The hydraulic lines to and from wheel motor 131 pass through swivel joint 113. Similarly, for right front wheel 101, turning of steering wheel 19 results in turning of steering cam 203 against cam follower 105 which controls steering valve 207. The hydraulic flow from steering valve 207 in turn controls rotary actuator 209 which turns wheel 101 thus actuating mechanical steering feedback 211 to shut off steering valve 207, as is more fully set out below. Turning of wheel 101 also causes turning of wheel speed control cam 213 which controls variable orifice 215 placed across the hydraulic line feeding into wheel motor 217 which propels wheel 101. The hydraulic lines feeding into and leading from wheel motor 217 pass through swivel joint 219. Similarly, for dual rear wheels 103 and 105, turning of steering wheel 19 results in movement of steering cam 223 against cam follower 225 which controls steering valve 227. Steering valve 227 in turn controls rotary actuator 151 which turns rear wheels 103 and 105, thus actuating mechanical steering feedback 231 which shuts off steering valve 227, as is more fully set out below. Turning of wheels 103 and 105 also results in turning of wheel speed control cams 173 and 175 which control variable orifices 179 and 177, respectively. Variable orifice 177 controls the flow of hydraulic fluid to wheel motor 161 which propels wheel 103. Variable orifice 179 controls the flow of hydraulic fluid to wheel motor 163 which propels wheel 105. The hydraulic lines to and from wheel motors 161 and 163 pass through swivel joint 147. As steering wheel 19 is turned, steering valves 185, 207 and 227 all are shifted in the same direction for the same direction of turn. If the vehicle operator turns the wheels 99, 101, 103 and 105 while vehicle 13 is stationary, the rear wheels 103 and 105 are thus caused to roll about their pivot. To prevent skidding of the rear wheels during such turning, rear wheels 103 and 105 force their corresponding wheel motors 161 and 163 to turn and thus act as pumps. In order to allow fluid transfer between motors 161 and 163, cross-over orifice 247 is needed to conduct hydraulic fluid from the pressure side of one motor to the suction side of the other motor. Wheel speed control valves 177 and 179 provide a path for hydraulic fluid between the other pair of pressure side and suction side for motors 161 and 163, thus completing a hydraulic circuit including cross-over orifice 247.

Figure 9:
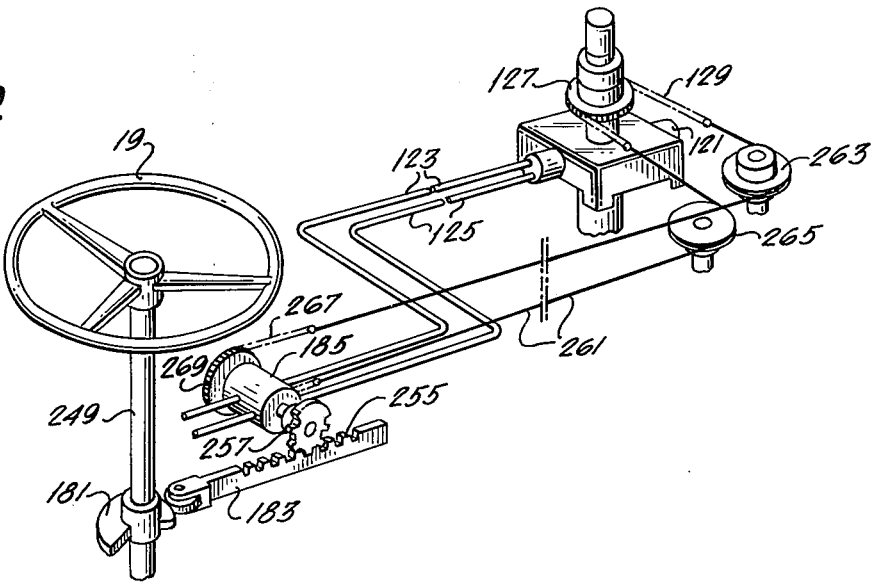
FIG. 9 shows the steering and feedback system for the wheel of FIG. 6.
Figure 10:
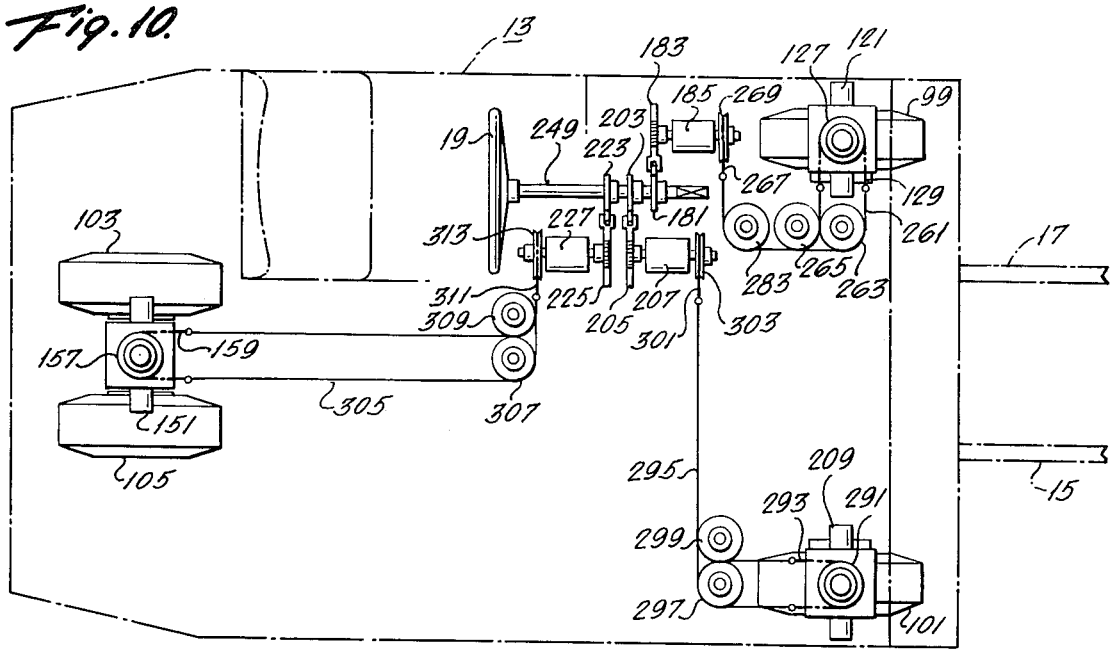
FIG. 10 is a diagrammatic view of the vehicle of FIG. 2 showing the steering feedback system for all wheels.

For the mechanical steering feedback system for left front wheel 99 illustrated in FIG. 9, turning of steering wheel 19 results in turning of steering column 249 and thus of steering cam 181 against cam follower 183. Cam follower 183 includes rack 255 which when moved by cam 181 turns pinion 257 of steering valve 185, thus resulting in a flow of hydraulic fluid through hydraulic lines 123 and 125 to rotary actuator 121. When rotary actuator 121 then turns steered wheel column 111, sprocket 127 and mechanical feedback chain 129 turn with it, resulting in movement of mechanical feedback cable 261 about cable pulleys 263 and 265. Movement of mechanical feedback cable 261 causes movement of feedback chain 267 on sprocket 269 of steering valve 185 in the same direction as that induced by rack 255 and pinion 257. In this way, steering valve 187 is shut off after completion of turning of steered wheel column 111 by rotary actuator 121 to the required angle. As shown in FIG. 10, right front wheel 101 has a similar mechanical steering feedback system like that shown above for left front wheel 99. As shown in FIG. 10, dual rear wheels 103 and 105 together have a similar mechanical steering feedback system like that shown above for left front wheel 99. Where two separate rear wheels are used in lieu of dual rear wheels 103 and 105, as discussed above, each rear wheel will have a similar mechanical steering feedback system like that shown above for left front wheel 99. Where a single rear wheel is used in lieu of dual rear wheels 103 and 105, as discussed above, the rear wheel will have a similar mechanical steering feedback system like that shown above for left front wheel 99.

The overall mechanical feedback system for all wheels 99, 101, 103 and 105 of vehicle 13 is shown in FIG. 10. Steering column 249 acts as a common camshaft for steering cams 181, 203 and 223 which control, as steering wheel 19 is turned, steering valves 185, 207 and 227, respectively, through cam followers 183, 205 and 225, respectively, in the manner described in FIG. 9. As rotary actuator 121 turns left front wheel 99 in response to movement of steering valve 185, sprocket 127 moves chain 129 and thus mechanical feedback cable 261 over pulleys 263, 265 and 283 to chain 267 on sprocket 269 of steering valve 185. Similarly, as rotary actuator 209 turns right front wheel 101 in response to movement of steering valve 207, sprocket 291 causes movement of chain 293, and thus of mechanical feedback cable 295 over pulleys 297 and 299 to turn chain 301 and thus sprocket 303 of steering valve 207. Similarly, as rotary actuator 151 turns rear wheels 103 and 105 in response to movement of steering valve 227, sprocket 157 is turned, causing movement of chain 159 and thus of mechanical feedback cable 305 over pulleys 307 and 309 to move chain 311 over sprocket 313 of steering valve 227. In this manner, as wheels 99, 101, 103 and 105 perform a turn commanded by turning of steering wheel 19, mechanical feedback cables 162, 295 and 305 cause steering valves 185, 207 and 227, respectively, to return to normal to prevent turning beyond that desired. The more a steering valve 185, 207 or 227 is displaced by steering cam 181, 203 or 223 with cam follower 183, 205 or 225, the more the corresponding wheel 99, 101, or 103 and 105, must be turned and the more the feedback cable 261, 295 or 305 must move in order to return that steering valve 185, 207 or 227 to its normal position when the turn is completed.

Figure 11:
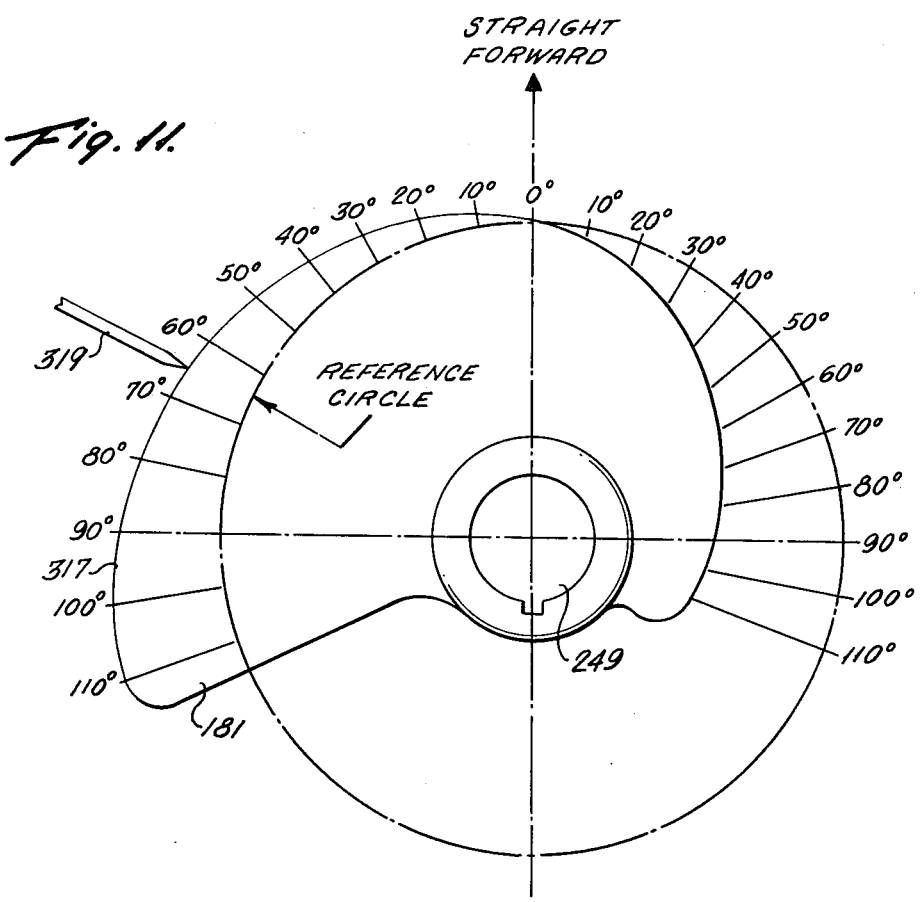
FIG. 11 shows the typical shape of the steering cam used in the left front steering system of FIG. 9.

To calculate the configuration of the surface of steering cams 181, 203 and 223, for one example, referring again to FIG. 5, let the base $b$ be 9', hitch arm length $t$ the 9', and the vehicle width $w$ be 6'. Point P is the common center of turn. Now, using the trigonometric definition of the tangent, $$\tan \theta_1 = \frac{t}{r_0 + \frac{1}{2} w}$$

$$\tan \theta_2 = \frac{t}{r_0 - \frac{1}{2} w}$$

$$\tan \theta_3 = \frac{t + b}{r_0}$$

for a freely-rolling configuration. Let the vehicle steering wheel 19 be turned 10°. The steering camshaft 249 and all steering cams 181, 203 and 223 can then, for purposes of simplifying this example, also be turned 10°. Using left front wheel 99 as a reference, $\theta_1 = 10°$ or $\tan \theta_1 = 0.176$. Solving for $r_0$ yields a value of 48 feet. Then, $$\tan \theta_2 = \frac{9}{48 - 3} = .200$$

or $\theta_2 = 11.3°$ and $$\tan \theta_3 = \frac{9 + 9}{48} = \frac{18}{48} = .375$$

or $\theta_3 = 20.5°$. Let 0.100 inch of radial change on the cam surface (or 0.100 inch of cam/follower travel) cause 10° of wheel steering. Therefore, cam 181 for vehicles wheel 99 is cut so that at 10° from the "straight forward" or neutral position, with the vehicle wheels straight ahead, the cam surface is cut to be plus or minus, depending on choice, 0.100 inch away from a reference circle, such as the reference circle shown in FIG. 11. Similarly, cam 203 for vehicle wheel 101 is cut so that for 10° from neutral, the cam surface is 0.113 inch from the reference circle. Similarly, cam 223 for $\theta_3$ is cut so that for 10° from neutral, the cam surface is 0.205 inch from the reference circle. This process is continued for various steering camshaft angles to generate the required cam shape for each one. Thus one shape of cam 181 for $\theta_1$, with a knife-edge cam follower 319, is shown in FIG. 11. This shape would be modified if a roller cam follower of a particular diameter were used instead of a knife-edge follower. Knife-edge follower 319 follows the cam surface 317 of cam 181 and is displaced as the cam is turned by steering column or camshaft 249. It should be understood that this is but one example of one cam shape for one particular cam, and the three formulas given above can be used in the manner described above to produce other cam shapes for all three cams 181, 203 and 223. It should also be understood that a single wheel could be used in lieu of the dual rear wheels 103 and 105 shown in FIG. 5, with the same three formulas used for determining the shapes of the three steering cams. As another alternative, should it be desired to use two separate rear wheels instead of the dual rear wheels 103 and 105, where the respective angles from the aircraft nose or tail wheel axis for the left front, right front, left rear, and right rear wheels would be $\theta_1$, $\theta_2$, $\theta_3$, and $\theta_4$, the tangents for these angles would then be:

$$\tan \theta_1 = \frac{t}{r_0 + \frac{1}{2} w}$$

$$\tan \theta_2 = \frac{t}{r_0 - \frac{1}{2} w}$$

$$\tan \theta_3 = \frac{t + b}{r_0 + \frac{1}{2} w}$$

$$\tan \theta_4 = \frac{t + b}{r_0 - \frac{1}{2} w}$$

The four steering cams required for such a vehicle would then have to be cut according to the above four formulas.

It should be understood that any number of steered vehicle wheels can be used with this invention. Also, should it be desired to vary the hitch arms length extensively, the appropriate steering geometry could be readily enforced by installing an appropriately shaped set of steering cams. In addition, this towing vehicle can be used to tow vehicles other than aircraft, provided that the towed vehicle has a pivotable wheel.

In summary, the aircraft towing vehicle 13 of the present invention can be used for towing, spotting and handling of a typical aircraft 11. Each of wheel 99, 101, 103 and 105 of vehicle 13 is powered by a separate hydraulic motor 193, 217, 161 and 163, respectively, each of which is controlled by a separate wheel speed control cam and variable orifice combination controlling flow of hydraulic fluid to their respective motor as the corresponding wheel is turned. Steering is accomplished by means of steering wheel 19 or a lever to turn steering column or camshaft 249 and cams 181, 203 and 223 with it. Turning of steering cams 183, 203 and 223 against their respective cam followers 183, 205 and 225 results in operation of hydraulic steering valves 185, 207, and 227 which in turn operate rotary actuators 121, 209 and 151 which cause wheels 99, 101, and 103 and 105, respectively, to turn, according to the adjustment of steering valves 185, 207 and 227 caused by movement of cams 181, 203 and 223, respectively. As each wheel is turned, this turning is sensed by feedback cables 277, 295, and 305 which return steering valves 185, 207 and 227, respectively, to their normal positions when the turn requested by the operator is completed. For moving aircraft 11 with vehicle 13, the vehicle is first positioned so that the aircraft nose wheel 25 is located between engagement pins 21 and 23. Any necessary vertical positioning of pins 21 and 23 is accomplished by adjusting the hitch arms 15 and 17 with elevating cylinder 91 so that pins 21 and 23 travel in a vertical plane. Hitch arms 15 and 17 are then brought together, by the turning of threaded bars 37 and 67 by hydraulic motor 61, so that pins 21 and 23 engage the hollow axle 24 of wheel 25. Should wheel 25 not be centered between pins 21 and 23, then, as the first hitch arm 15 or 17 makes contact with wheel 25, mechanism base 27 is forced to slide on base 85 through dovetail slots 87 and 89. When pins 21 and 23 engage wheel 25, vehicle 13 can then be used to move, spot or handle aircraft 11 by pushing or pulling aircraft 11 at wheel 25.

Thus there has been provided a novel multi-purpose aircraft towing vehicle with improved maneuverability, able to handle aircraft of any gross weight or configuration, on flight deck, hangar deck or shore base, without use of a tow bar. The hitch arms render this vehicle capable of engaging difficult to reach aircraft wheels, and provide adequate stand-off from the aircraft so that the towing vehicle height limitations can be relaxed. This is an easily maneuverable aircraft towing vehicle which does not require a highly skilled operator, thus easing operating training, usable in restricted spaces such as on an aircraft carrier, especially on a congested deck. The hitch arms configuration for this vehicle results in a simple, shorter, more wieldly train for connection between and aircraft towing vehicle and an aircraft. This vehicle has coordinated all wheel steering so that the common center of turn for all wheels is on the aircraft nose or tail wheel centerline or axis, thus permitting a pivot turn around that aircraft wheel, preventing aircraft wheel sideslip during turns, and side loads on the hitch arms engaging the wheel, even though the attachment to the towing vehicle is rigid, Obviously, many modifications and variation of the present invention are possible in light of the above teachings. It is therefore to be understood that within the scope of the appended claims the invention may be practiced otherwise than as specifically described.

What is claimed is:

1. A towing vehicle for moving on a surface a towable vehicle having a pivotable wheel, comprising:
    a frame;
    a plurality of individually steerable wheels pivotally connected to said frame;
    hitch means extending from said frame and formed to engage the pivotable wheel for maintaining the axes of said pivotable wheel fixed relative to said frame; and
    steering means operatively connected to said towing vehicle wheels responsive to a steering command for separately positioning each towing vehicle wheel, the axes of all said towing vehicle wheels and the pivotable wheel intersecting at a common point.

2. A towing vehicle as defined in claim 1 wherein said steering means comprises:
    a first camshaft having a plurality of cams thereon;
    steering actuator means connected to said camshaft for selective rotation thereof;
    a like plurality of cam followers, each of said cam following being operatively connected to a corresponding one of said first plurality of cams cams;
    a like plurality of hydraulic valves, each of said valves being operatively connected to a corresponding one of said cam followers so that said cam follower can adjust said valve from its inactive to its active position;
    a like plurality of hydraulic rotary actuators, each of said actuators being operatively connected to a corresponding one of said hydraulic valves for selectively turning at least one of said wheels; and
    a like plurality of cables, each of said cables being operatively connected to a corresponding one of said hydraulic rotary actuators and to said corresponding one of said hydraulic valves for returning said corresponding one of said hydraulic valves to its inactive position.

3. A towing vehicle as defined in claim 2 wherein:
    said plurality of wheels comprises two separate wheels proximal said pivotable wheel and a wheel distal said pivotable wheel;
    said first plurality of cams comprises first, second and third steering cams, for each of said proximal wheels and said distal wheel, respectively;
    said first steering cam is shaped according to the formula $$\tan \theta_1 = \frac{t}{r_0 + \frac{1}{2} w}$$

where $\theta_1$ is the angle at which one of said proximal wheels is turned, this the distance between said towing vehicle proximal wheels axis and the pivotable wheel, $w$ is the wheel track of said towing vehicle and $r_0$ is the distance between the common point and the pivotable wheel;

said second steering cam is shaped according to the formula $$\tan \theta_2 = \frac{t}{r_0 - \frac{1}{2} w}$$

where $\theta_2$ is the angle at which the other of said proximal wheels is turned; and said third steering cam is shaped according to the formula $$\tan \theta_3 = \frac{t + b}{r_0},$$

where $\theta_3$ is the angle at which said distal wheel is turned, and $b$ is the wheelbase of said towing vehicle.

4. A towing vehicle as defined in claim 1, further comprising:
    propulsion means connected to said steerable wheels for individually propelling each of said steerable wheels.

5. A towing vehicle as defined in claim 4 wherein said propulsion means comprises:
    a second plurality of cams, each of said cams being operatively connected to a corresponding one of said wheels;
    a like plurality of motors, each of said motors being operatively connected to said corresponding one of said wheels, for propelling said wheels;
    a power supply for powering said motors;
    a like plurality of power-conveying means lines, each of said lines operatively connecting a corresponding one of said motors with said supply; and
    a like plurality of power control valve means, each of said power control valve means being operatively connected to a corresponding one of said second plurality of cams and to a corresponding one of said lines for controlling the transmission of power through said corresponding one of said lines.

6. A towing vehicle as defined in claim 4 wherein said propulsion means comprises:
    a plurality of wheel motors, each of said wheel motors being operatively connected to one of said plurality of steerable wheels for rotation of said wheels and propulsion of said towing vehicle; and
    a like plurality of propulsion control means, each of said plurality of propulsion control means being operatively connected to a respective one of said plurality of wheel motors, for controlling the amount of propulsion delivered by said wheel motor to said steerable wheel.

7. A towing vehicle as defined in claim 1, wherein said hitch means comprises:
    two parallel laterally rigid members.

8. A towing vehicle as defined in claim 7 wherein said hitch means further comprises:
    coaxially opposed pins positioned at the distal ends of said members, said pins being formed to engage the axle of the pivotable wheel.

9. A towing vehicle as defined in claim 7 wherein said hitch means further comprises:
    means for laterally moving said members in opposing directions with respect to each other for selectively engaging and disengaging the pivotable wheel.

10. A towing vehicle as defined in claim 9 wherein said lateral moving means comprises:

two threaded rotatable bars, each of said bars having opposite threads about the opposing ends thereof, threadingly engaging each of said members; and motor means rotatably connected to each of said bars for rotation thereof.

11. A towing vehicle as defined in claim 7 wherein said hitch means further comprises:

means for vertically aligning the distal ends of said members in a flat vertical plane.

12. A towing vehicle as defined in claim 11 wherein said vertical aligning means comprises:

a first rigid bar pivotably engaging each of said members near the respective proximal end thereof within said second vehicle;

first and second crankshafts, each of said crankshafts at one end thereof rotatably engaging the respective ends of said first rigid bar, and being rotatably engaged at the other end about a common axis;

a cylinder with extendable piston;

an arm rotatably engaging at one end thereof said piston and said first rigid bar, and being rotatably engaged at the other end about the common axis; and a second rigid bar slidably engaging each of said members intermediate the respective ends thereof.

13. A towing vehicle as defined in claim 1 comprising:

means for horizontally aligning said members and for centering said members about the pivotable wheel.

14. A towing vehicle as defined in claim 13 wherein said horizontal aligning means comprises:

a first platform fixed within said second vehicle; and a second platform, slidably engaged with said first platform, for supporting said members.

15. A towing device for moving on a surface a first vehicle having a pivotable wheel, comprising:

a self-propelled second vehicle;

means having two parallel vertically and laterally adjustable members extending from said second vehicle and formed to engage the pivotable wheel at the tips of said members by lateral adjustment of said members for maintaining a predetermined distance between said first and second vehicles and for permitting the wheel to rotate on the surface;

a first rigid bar pivotably engaging each of said members near the respective proximal end thereof within said second vehicle;

first and second crankshafts, each of said crankshafts at one end thereof rotatably engaging the respective ends of said first rigid bar, and being rotatably engaged at the other end about a common axis;

a cylinder with extendable piston;

an arm engaging at one end thereof said piston and said first rigid bar, and being rotatably engaged at the other end about the common axis; and a second rigid bar slidably engaging each of said members intermediate the respective ends thereof whereby the said tips are maintained in a vertical plane regardless of the vertical position of said members.

16. A towing device as defined in claim 15 comprising:

coaxially opposed pins positioned at the distal ends of said members, said pins being formed to engage the axle of the pivotable wheel.

17. A towing device as defined in claim 15 comprising:

means for laterally moving said members in opposing directions with respect to each other for selectively engaging and disengaging the pivotable wheel.

18. A towing device as defined in claim 17 wherein said lateral moving means comprises:

two threaded rotatable bars, each of said bars having opposite threads about the opposing ends thereof, threadingly engaging each of said members; and motor means rotatably connected to each of said bars for rotation thereof.

19. A towing device as defined in claim 15 wherein said distance maintenance means further comprises:

means for vertically aligning the distal ends of said members in a flat vertical plane for maintaining said predetermined distance.

20. A towing device as defined in claim 15 comprising:

means for horizontally aligning said members and for centering said members about the pivotable wheel.

21. A towing device for moving on a surface a first vehicle having a pivotable wheel, comprising:

a self-propelled second vehicle;

means having two parallel laterally and vertically adjustable members extending from said second vehicle and formed to engage the pivotable wheel for maintaining a predetermined distance between said first and second vehicles and for permitting the wheel to rotate on the surface;

a first platform fixed within said second vehicle; and a second platform, slidably engaged with said first platform, for supporting said members;

whereby said second platform can slide relative to the first during engagement of the wheel by said members.

22. A towing vehicle as defined in claim 1 wherein said steering means comprises:

steering actuation means, movably disposed on said frame and responsive to said steering command, for producing a plurality of pivoting signals, one signal for each said steerable wheel of said towing vehicle, indicative of the amount of pivoting of each said steerable wheel necessary to fulfill the steering command;

a plurality of rotary actuation means, each responsive to a respective one of said plurality of pivoting signals and operatively connected to a respective one of said steerable wheels of said towing vehicle for separately positioning each said steerable wheel; and servo means operatively connected between said steering actuation means and said rotary actuation means, responsive to said plurality of pivoting signals, for providing a respective one of said plurality of pivoting signals to a respective one of said plurality of rotary actuating means.

* * * * *

UNITED STATES PATENT AND TRADEMARK OFFICE
CERTIFICATE OF CORRECTION

PATENT NO. : 4,057,158
DATED : November 8, 1977
INVENTOR(S) : Igor Lissy

It is certified that error appears in the above-identified patent and that said Letters Patent are hereby corrected as shown below:

Column 11, line 32, change "following" to --followers--.

Column 11, line 64, change "this" to --t is--.

Signed and Sealed this

Fourth Day of July 1978

[SEAL]

Attest:

RUTH C. MASON
Attesting Officer

DONALD W. BANNER
Commissioner of Patents and Trademarks